Sept. 22, 1953      D. GARDNER      2,653,082
PROCESS FOR PRODUCTION OF FINE GRAPHITE
Filed Aug. 17, 1949
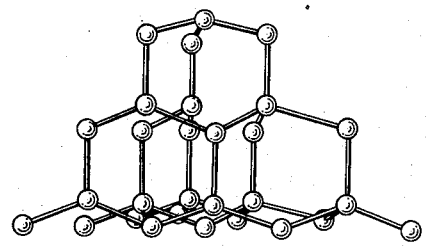
CRYSTAL STRUCTURE OF DIAMOND
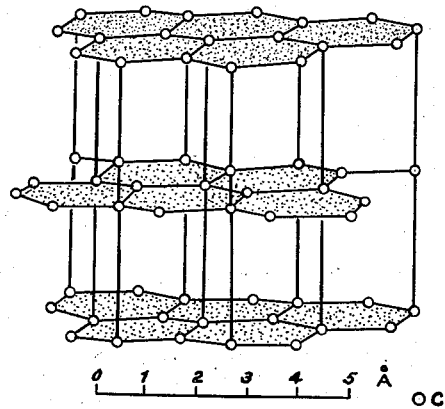
CRYSTAL STRUCTURE OF GRAPHITE Patented Sept. 22, 1953

2,653,082

UNITED STATES PATENT OFFICE 2,653,082

PROCESS FOR PRODUCTION OF FINE GRAPHITE

Daniel Gardner, New York, N. Y.

Application August 17, 1949, Serial No. 110,895

8 Claims. (Cl. 23—209.1)

This invention relates to very fine graphite and is more particularly concerned with the process for the production of the same.

In my co-pending application Serial No. 72,280, filed January 22, 1949, entitled "Process for Production of Unctuous Graphite," I disclosed a process for the production of a high grade extremely unctuous graphite employing an unsaturated hydrocarbon as the raw material. The product resulting from that process is a high grade one and has particular suitability for conditions where unctuousness is of importance, such as in the lubricating field. Another, though by no means limiting, example of its use is in the ink field. The present invention is also concerned with the production of high grade graphite which is very fine throughout, even more so than that produced by the method of my said co-pending application. The graphite of the instant invention, however, is less unctuous than that produced according to my co-pending application, but is more suitable for being formed into electrodes, tubes and other high quality graphite elements.

It is, accordingly, a principal object of this invention to produce very fine synthetic graphite.

Another object is to produce very fine synthetic trivalent graphite in pure state.

Still another object is to produce very fine synthetic graphite which is fully graphitized throughout.

A further object is to produce a very fine synthetic graphite which will withstand extremely high temperatures and is adaptable to being formed into high grade operating elements.

Further and more detailed objects of the invention will be apparent as the description thereof proceeds.

As in the process disclosed in my aforementioned application, Serial No. 72,280, the instant process requires that contact of the raw material with all active gases be avoided throughout all the stages of the process. Thus, whenever in the process there is a likelihood of atmospheric contamination, the steps must be carried out in an atmosphere of a gas which is inert with respect to the raw material which is employed. For effective treatment of the carbon particles they must be maintained at the lowest possible temperature. This enables the use of an atmosphere of nitrogen gas, since I have found the same to be inert with respect to the carbon at the temperatures I employ. Other inert gases can, of course, be employed if desired, or the process can be carried on in a vacuum.

It was also pointed out in my said co-pending application that the presence of impurities very seriously affects the quality of the graphite. Thus such materials as might contaminate the final product are to be strictly avoided. Any aids employed are only such as can be readily removed, or will entirely pass off in the course of the processing.

In the instant process I employ carbon monoxide as the basic raw material. I have found that this gas may be broken down into carbon of desired fineness and quality and oxygen by either electrical or chemical action. Considering, first, the electrical action, I passed the carbon monoxide gas through a spark gap across which a spark is passing, resulting from a current having a frequency of substantially 500 kilocycles and a voltage in the region of 100,000. The action of this spark separated the carbon from the oxygen so that the desired carbon particles and oxygen gas resulted. These carbon particles were found to be of extreme fineness, but were of a tetravalent carbon, whereas trivalent graphite was the desired product. Thus, the particles were collected in a chamber underlying the spark gap while the splitting action and collection of the particles was being carried on in an atmosphere of nitrogen. I have also found that the use of vacuum or other gases inert with respect to the carbon at the temperature of the reaction would also produce effective results. The oxygen was let off and collected in a suitable receptacle, such as a wash bottle, care being taken to isolate it from any further contact with the carbon.

In order to further treat the carbon, so as to convert it to trivalent graphite, it was necessary to heat it throughout. To do this effectively is difficult, since the particles have a very high insulating effect and thus resist high temperature action. Furthermore, any results obtainable by high temperature heating are not what are desired. I have found, however, that a proper heating of the particles can be carried out by introducing them into, and admixing them uniformly with a calcium compound, preferably powdered dry calcium carbide. The carbon particles were accordingly homogeneously mixed with powdered dry calcium carbide and this mixture was introduced into a molten bath of anthracene. Preferably such bath should be kept as close to a temperature of 400° C. temperature as can reasonably be done without exceeding that temperature. I have, however, achieved satisfactory results with comparable variations in heating time by employing baths at temperatures between 300° and 400° C.

The boiling point of anthracene being 345° C., it is obvious that by heating the bath to above that temperature the anthracene will be caused to boil off. The anthracene does not break down at a temperature anywhere near its boiling point so it is merely necessary to collect the anthracene vapors in a reflux condenser and allow the condensed drops to fall back into the bath. This cycle can be continued until the carbon has been sufficiently heated to convert it into trivalent graphite.

As an alternative, the heating can, of course, be carried on under pressure. It is preferable, however, to avoid the use of pressure and employ a reflux condenser instead.

Naphthalene may be employed in place of anthracene, but its lower boiling point, 218° C., renders it less desirable. Its vapors do not break down until well over 1000° C., higher than the breakdown temperature of anthracene, so it can be used effectively if properly handled.

The action of the anthracene or naphthalene, neither of which do react with the carbon, is as a heating medium whereby the carbon particles are heated uniformly and throughout, and are quickly converted from tetravalent carbon to the extremely high grade trivalent graphite.

The mixture of the carbon particles and the unreacted calcium carbide was thereafter removed from the anthracene by suitable filtering, leaving behind any lime formed, and the particles of graphite so formed were separated from the unreacted carbide by dissolving them in cyclo-octane $(CH_2)_8$ having a melting point of 14.4° C., and a boiling point of 147° C., a density=.839. The carbon particles were then regained by distilling off the solvent. This step of my process served to separate the carbon particles, already in the form of unpalpably fine graphite, from the calcium carbide. The yield of the graphite particles here was very high and the particles recovered were in the same state as they were after the heating in anthracene. The particles recovered were then dried, and collected in finished condition, ready to be pressed, or formed, into graphite elements.

Though cyclo octane is preferable as the separating medium, I have found other materials which will serve the same purpose. Among these are cyclo hexane and cyclo heptane, but the presently preferable alternative is mellitic acid which has the formula $C_6(COOH)_6$ and boils at a temperature low enough, 286° C., to be readily useable.

I have discovered an alternate manner of breaking carbon monoxide down to produce fine graphite particles of the type here considered. Acetylene gas is produced by the reaction of calcium carbide with cold water. An entirely different reaction takes place when steam at dark red heat, that is between 650° and 750° C., is brought into contact with calcium carbide. There no acetylene is formed, and the reaction goes,

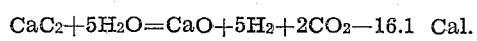

$$CaC_2 + 5H_2O = CaO + 5H_2 + 2CO_2 - 16.1 \text{ Cal.}$$

This example is merely given to show that in the absence of water as such calcium carbide acts quite differently from the way it does when brought into contact with cold water. Going beyond this, I discovered that when dried calcium carbide, preferably in powdered form, was introduced into anhydrous sulfuric acid at a temperature below 275° C. and, after they were mixed together, carbon monoxide was introduced in the mixture, the following modified reaction took place:

$$CaC_2 + CO + H_2SO_4 = CaSO_4 + 3C + H_2O + 173.3 \text{ Cal.}$$

When the reaction had gone to completion, I boiled the water away and decanted off the calcium sulfate. This left merely particles of very fine graphite which were rapidly washed to remove any impurities, and then dried ready for use.

The graphite particles so produced were the same in all respects as those produced by the break down of carbon monoxide by means of the high frequency electric spark. They were of extreme fineness and were ideally constituted for use in the production of high grade graphite elements. They differ, however, from the particles produced by the process of my co-pending application Serial No. 72,280 in that their unctuousness is substantially reduced, such reduction being in the neighborhood of 30%.

In place of the calcium carbide employed in the foregoing process, I have found that the carbides of barium, or strontium, may be employed. In addition, mixtures of such carbides may also be employed.

For a better appreciation of the difference in carbon structure so readily and effectively brought about by the process of my invention, a drawing of two illustrations of crystal structures is submitted as a part of this specification. The first, labeled "Crystal structure of diamond," is illustrative of tetravalent carbon, while the illustration labeled "Crystal structure of graphite" shows what is achieved by the process of the invention in converting tetravalent carbon to high grade trivalent graphite.

Having described my invention, what I claim as new and desire to secure by Letters Patent is:

1. A process for the production of finely divided carbon resembling graphite which comprises mixing finely divided carbon with a carbide, introducing the mixture into a heating medium of non-reactive liquid, heating the mixture therein to a temperature of from 300° C. to 400° C. to convert the carbon particles into a finely divided product substitutable for graphite in forming high quality electrodes, and removing said product from the heating medium and the carbide.

2. A process according to claim 1, in which the carbide is selected from the group of calcium, strontium and barium carbides.

3. A process according to claim 1, in which the carbide is calcium carbide.

4. A process according to claim 1, in which the heating medium is a bath consisting of anthracene.

5. A process according to claim 1, in which the heating is to a temperature close to 400° C.

6. A process according to claim 1, in which the heating medium is a bath of anthracene, the product and the carbide mixture is removed from the bath by filtration, and the product is recovered from the mixture by dissolving it in cyclo-octane.

7. A process according to claim 1, in which the product is separated from the carbide by dissolving the product from the mixture.

8. A process according to claim 7, in which the product is dissolved in cyclo-octane.

DANIEL GARDNER.

References Cited in the file of this patent

UNITED STATES PATENTS

| Number | Name | Date |
|---|---|---|
| 682,249 | Frank | Sept. 10, 1901 |
| 1,887,792 | Driessche | Nov. 15, 1932 |

FOREIGN PATENTS

| Number | Country | Date |
|---|---|---|
| 23,957 | Great Britain | 1897 |
| 507,516 | Great Britain | June 16, 1939 |

OTHER REFERENCES

Mellor: Inorganic and Theoretical Chemistry, vol. 5, Longmans, Green and Co., N. Y. (1924), pages 837–839.